Oct. 19, 1948.   R. B. BUCHANAN   2,451,609
ARRESTING HOOK DEVICE FOR GROUNDED AIRCRAFT PILOT TRAINERS
Filed Oct. 12, 1945
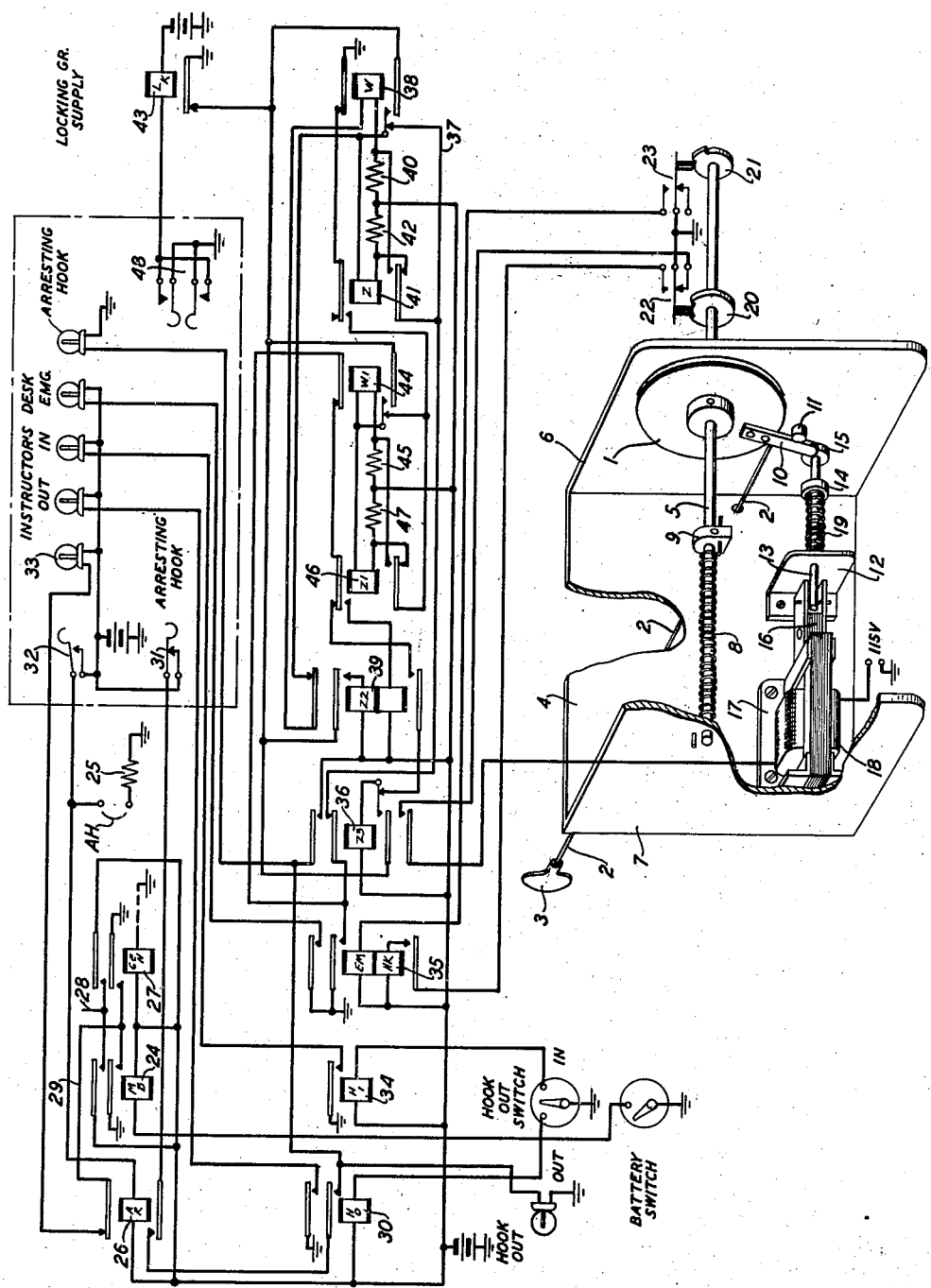
INVENTOR
R. B. BUCHANAN
BY
*P. C. Smith*
ATTORNEY Patented Oct. 19, 1948

2,451,609

UNITED STATES PATENT OFFICE 2,451,609

ARRESTING HOOK DEVICE FOR GROUNDED AIRCRAFT PILOT TRAINERS

Russell B. Buchanan, Lynbrook, N. Y., assignor to Bell Telephone Laboratories, Incorporated, New York, N. Y., a corporation of New York Application October 12, 1945, Serial No. 622,067

7 Claims. (Cl. 35—12)

This invention relates to an operational flight trainer and more particularly to circuits and apparatus for simulating the control of the arresting hook of a carrier based airplane.

A carrier based airplane is provided with a retractable arresting hook located in the underside of the tail structure near the rear end thereof which may be extended under control of the pilot when he comes in for a landing on the flight deck of the carrier. The hook when extended and when the pilot has brought the main landing gear wheels of the airplane into engagement with the flight deck of the carrier, will engage one of several cables which the carrier crew has stretched across the flight deck and supported a few inches above the flight deck preparatory to receiving airplanes back on the flight deck of the carrier. When the extended arresting hook of an airplane hooks onto a cable, the airplane is quickly brought to rest.

The arresting hook is, under normal conditions, either extended or retracted by an electric motor controlled by a switch located on an electrical distribution panel in the cockpit of the airplane, the motor being operated in one direction to extend the hook when the control switch is operated to the "out" position and being operated in the other direction to retract the hook when the control switch is operated to the "in" position. A lamp is associated with the control switch which becomes lighted to inform the pilot when the hook has been fully extended.

In the event that the electric motor control fails, the hook may be extended manually by the operation of a T-handle arresting hook emergency control which is located adjacent to the pilot's seat. To manually extend the hook the pilot pulls the T-handle out to the limit of its movement several times whereby a pawl and ratchet mechanism operated thereby serves to extend the hook. When the hook has been fully extended by the repeated operation of the T-handle, the lamp associated with the electric control switch will light. The arresting hook cannot be retracted by the manual control.

It is the object of the present invention to simulate in a ground trainer, the operation of the arresting hook, under both electric and manual controls and to provide signals at an instructor's desk which will indicate to the instructor what steps the pilot is taking to get the hook extended before coming in for a simulated landing.

To enable the object of the invention to be attained, the trainer is equipped with an electric control switch and associated lamp mounted on an electrical distribution panel of the cockpit of the trainer in the position which such switch and lamp would occupy in the actual airplane which the trainer is designed to simulate and having the same appearance that they would have in the airplane. Also a T-handle arresting hook emergency control of the same construction and located in the same position in the cockpit of the trainer as it would have in an actual airplane is provided.

The electric control switch through relays lights lamps at the instructor's desk to inform the instructor whether the pilot has operated the switch to its "out" or to its "in" position and one of which relays lights the "hook out" lamp associated with the switch when such switch has been operated to its "out" position. The T-handle emergency control in the trainer when pulled out to its full extent five times against the tension of a loading spring and released, operates a chain of counting relays which counts the number of times the handle is pulled out and after the handle has been released, following its fifth operation, causes the lighting of the "hook out" lamp and the locking of the handle against further operation. Lamps provided at the instructor's desk and controlled by the chain of relays inform the instructor that the emergency manual control is being used by the pilot and when the hook has been fully extended under such manual control.

For a disclosure of the invention, reference may be had to the single sheet of drawings.

The "hook out" switch and "hook out" lamp form a unit assembly which is mounted on an electrical distribution panel in the cockpit of the trainer. Also mounted on this panel are the "battery switch" and a plurality of circuit-breakers which control various circuits of the trainer, one of which, AH, controls the circuits which are concerned with the simulation of the operation of the arresting hook. Such lamps and keys at the instructor's desk as are concerned with the simulation of the operation of the arresting hook are shown in the dot-dash rectangle labeled "Instructor's desk." The relays disclosed in the drawing are all mounted in the apparatus cabinets connected by cables with the mock-up of the airplane fuselage and with the instructor's desk.

The T-handle emergency control mechanism is disclosed schematically in the lower portion of the drawing. This mechanism comprises an operating pulley 1 around the grooved periphery of which a cable 2 is wrapped. One end of this cable is secured to the pulley and the other end is secured to the T-handle 3. The T-handle is slidable through the bulkhead back of the pilot's seat and is accessible for operation by the pilot. The pulley 1 is mounted on a shaft 5 suitably journaled in the two parallelly disposed mounting plates 6 and 7 of the supporting frame 4. The shaft 5 is rotatable by the pulley 1 against the restraint of the spiral spring 8 which surrounds the shaft 5 and has one of its ends engaged in a hole in the plate 7 and the other of its ends secured to the collar 9 mounted on and secured to the shaft 5. The spring 8 is tensioned to normally hold the arm 10 secured to pulley 1 against the stop stud 11 and supplies a load to the T-handle 3 which is equivalent to the load applied thereto in the operation of the ratchet mechanism of an actual airplane which extends the arresting hook.

Positioned below the shaft 5 and slidable in holes provided in the plate 6 and in the bracket 12 is a rod 13. The rod 13 has two collars 14 and 15 secured thereto. Surrounding the rod and positioned between the bracket 12 and the collar 14 is a spiral spring 19 which is tensioned to normally move the rod 13 towards the right in which position the outer face of collar 15 engages against the inner surface of the plate 6. The other end of the rod 13 is secured to the end of the core 16 of solenoid 17 which is secured to the back plate of the frame 4.

With the coil 18 of the solenoid 17 deenergized and the collar 15 pressed against the plate 6 by the spring 19, the arm 10 is free to move over the rod 13 through the space between the collars 14 and 15 when the pulley 1 is rotated by the T-handle 3 and attached cable 2, until the pulley 1 makes nearly a complete revolution or until the arm 10 engages the back of the stop stud 11. The shaft 5 by cams 20 and 21 mounted thereon, controls the operation of the two spring assemblies 22 and 23. The spring assembly 22 is operated to its alternate position by cam 20 except in the normal position of the shaft 5 in which the arm 10 is held against the front of the stop stud 11 by spring 8, and the spring assembly 23 is operated into its alternate position by the cam 21 when the shaft 5 has been rotated through nearly a revolution or when the arm 10 rests against the back of the stud 11.

The apparatus having now been described, the manner in which it functions to train a pilot in the use of the equipment of an airplane which it simulates will now be discussed. To prepare the trainer for use the pilot operates the "battery switch" to its closed position thereby establishing the circuit of the MB relay 24 which connects battery and ground to battery and ground bus-bars 28 and 29 of the trainer and closes the circuit-breakers on the electrical distribution panel in the cockpit of the trainer. Since only the AH or arresting hook circuit-breaker is of interest in connection with the present invention, this circuit-breaker is the only one illustrated in the drawing. The closure of this circuit-breaker establishes an obvious circuit from ground, through resistance 25, over the contacts closed by the circuit-breaker and through the winding of the AR circuit-breaker relay 26 to battery. As soon as the simulation of the starting of the engine has been completed and the engine has attained a simulated speed of 1300 R. P. M., the GEN relay 27 operates in the manner described in the copending application of Germanton Serial No. 622,070, filed concurrently herewith, and connects battery and ground to the battery and ground bus-bars 28 and 29.

It will be assumed that in the course of the training flight the pilot is simulating a landing on the flight deck of a carrier and preparatory to landing operates the "hook out" switch to its left or "out" position in simulation of controlling the electric motor mechanism of an airplane to extend the arresting hook to its "out" position and holds the switch in its operated position until the "hook out" lamp lights. The closure of the switch establishes an obvious circuit for the hook out (HO) relay 30 which, over its upper contacts, establishes the circuit for the arresting hook out lamp at the instructor's desk to inform the instructor that the pilot is attempting to extend the hook by the electric motor. If this attempt is to be successful the "arresting hook" key 31 at the instructor's desk will be in its normal or closed position and with the circuit-breaker relay 26 operated, representative of the fact that power is available to operate the arresting hook motor, a circuit is established from battery over the contacts of key 31, over the lower contacts of relay 26, over the inner contacts of relay 30 and in parallel through the "hook out" lamp on the pilot's electrical distribution panel and through the "arresting hook" lamp at the instructors' desk to ground. These lamps will then both light to indicate that the hook has been successfully extended.

The instructor may prevent the lighting of these lamps by operating the key 31 whereupon the pilot, not seeing the "hook out" lamp light, should take steps to control the manual extension of the hook. The instructor may also prevent the lighting of the "hook out" lamp by simulating the blowing of the circuit-breaker AH through the operation of key 32. The operation of key 32 connects battery directly to the thermal circuit-breaker AH and if the key is held operated for a few seconds the circuit-breaker will blow open and the circuit of relay 26 will then be opened when the key 32 is released. Until the pilot recloses the circuit-breaker AH, lamp 33 associated with the key 32 at the instructor's desk remains lighted over a circuit from ground on bus-bar 29, over the back contact of relay 26 and through lamp 33 to battery. When the pilot is successful in causing the hook to be extended by the motor and the "hook out" lamp lights as previously described, the restoration of the "hook out" switch to its neutral position releases relay 30 and extinguishes the "hook out" lamp and extinguishes the "out" and "arresting hook" lamps at the instructor's desk. After landing he may cause the hook to be retracted by the motor by operating the "hook out" switch" to its right or "in" position thereby establishing an obvious circuit for the hook in (HI) relay 34 which upon operating establishes an obvious circuit for the "in" lamp at the instructor's desk. The lighting of the "in" lamp informs the instructor that the "hook out" switch has been operated by the pilot to the "in" position to retract the hook.

Should the "hook out" lamp fail to light, indicative of the fact that the motor for extending the hook has failed, the pilot then tries to extend the hook by pulling out and releasing the emergency T-handle 3 five times. When the handle is pulled out to its full extent the first time, the cam 21 rotated by the pulley 1 in response to pulling out the T-handle, operates the spring assembly 23 when the arm 10 is about to engage the back of stud 11 and closes an obvious circuit through the upper winding of the EM—HK relay 35 which operates and locks over a circuit from battery through its lower winding and lower contacts to ground over the alternate contacts of the spring assembly 22. When the handle is thereafter released and the arm 10 is restored under the influence of the spring 8, the cam 21 permits the spring assembly 23 to restore and open the initial circuit of relay 35, but the locking circuit of such relay will remain closed until the arm 10 engages the stop 11 at which time cam 20 will permit the spring assembly 22 to reopen the locking circuit of relay 35.

During the time that relay 35 is operated, an obvious circuit is established over its upper contacts for the EMG lamp at the instructor's desk to inform the instructor that the pilot has resorted to the use of the emergency equipment and a circuit is established from ground over the upper inner contacts of relay 35, over the upper back contact of the Z3 relay 36, over conductor 37, over the lower normal contacts of the W relay 38, over the upper back contact of the Z2 relay 39, through the winding of relay 38 and through resistance 40 to battery. A circuit is also closed from ground applied to conductor 37 by relay 36, over the lower normal contacts of relay 38, through the winding of the Z relay 41 and through resistance 42 to battery, but the winding of relay 41 is shunted over its own back contact and relay 41 does not therefore operate. Relay 38, however, operates and locks in a circuit from ground over the normal contacts of the LK relay 43, over the lower alternate contacts of relay 38, over the upper back contact of relay 39, through the winding of relay 38 and resistance 40 to battery. When relay 35 releases at the end of the releasing movement of the T-handle 3 and removes ground from conductor 37, relay 41 operates in a circuit from battery through resistance 42, through its winding and over the lower alternate contacts of relay 38 to ground at the back contact of relay 43. The release of relay 35 also extinguishes the EMG lamp at the instructor's desk.

In response to the pulling out of the T-handle 3 a second time, relay 35 again operates and locks and in operating again lights EMG lamp at the instructor's desk and reconnects ground to conductor 37. The connection of ground to conductor 37 now establishes a shunt of the winding of relay 38 over the lower front contact of relay 41, through the winding of relay 38, over the upper back contact of relay 39, over the lower alternate contacts of relay 38 and to ground at the back contact of relay 43. Relay 38 thereupon releases but relay 41 remains operated over a circuit from ground on conductor 37, over the lower normal contacts of relay 38, through the winding of relay 41 and resistance 42 to battery so long as relay 35 remains operated. With relay 38 released and relay 41 operated, a circuit is established from ground over the upper contacts of such relays, through the lower normal contacts and winding of the W1 relay 44 and through resistance 45 to battery. A circuit is also established in parallel through the winding of the Z1 relay 46 and resistance 47 to battery but the winding of relay 46 being shunted at this time over its own lower back contact, relay 46 does not operate. Relay 44, however, operates and locks in a circuit from battery through resistance 45, through its winding and over its lower alternate contacts to ground at the back contact of relay 43. When relay 35 releases at the end of the releasing movement of the T-handle 3 and removes ground from conductor 37, relay 41 releases and in turn removes ground from the lower back contact of relay 46. Relay 46 now operates in a circuit from battery through resistance 47, through its winding and over the lower alternate contacts of relay 44 to ground at the back contact of relay 43. The release of relay 35 also extinguishes the EMG lamp at the instructor's desk.

In response to the pulling out of the T-handle 3 a third time, relay 35 again operates and locks and in operating again lights the EMG lamp at the instructor's desk and reconnects ground to conductor 37. The reconnection of ground to conductor 37 establishes the previously traced circuit for the W relay 38 which again operates and locks over the previously traced circuit under the control of relay 43. When relay 35 again releases at the end of the third releasing movement of the T-handle the EMG lamp at the instructor's desk is again extinguished and ground is removed from conductor 37 whereupon the ground applied to the lower back contact of relay 41 which has maintained the winding of such relay shunted is removed and relay 41 again operates over a circuit which may be traced from battery through resistance 42, through its winding and over the lower alternate contacts of relay 38 to ground at the back contact of relay 43.

In response to the pulling out of the T-handle a fourth time, relay 35 again operates and locks and in operating lights the EMG lamp at the instructor's desk and reconnects ground to conductor 37 whereupon, with relay 41 now operated, the previously traced circuit is effective for shunting down relay 38. Relay 38 upon releasing establishes the previously traced holding circuit for relay 41 over its lower normal contacts so that relay 41 will now remain operated so long as relay 35 remains operated. With relay 41 operated and relay 38 now released, a circuit is established from ground over the upper contacts of relays 38 and 41, over the lower front contact of relay 46 and to the junction point between resistance 45 and the winding of relay 44 thereby shunting down relay 44. Relay 46 is now held operated in a locking circuit from battery through resistance 47, through the winding of relay 46, over the lower normal contacts of relay 44 and the upper contacts of relays 41 and 38 to ground so long as relay 41 remains operated. With relay 46 operated and relay 44 now released, a circuit is established from ground over the inner upper contacts of relay 35, over the upper back contact of relay 44, over the upper front contact of relay 46 and through the lower winding of the Z2 relay 39 to battery, whereupon relay 39 operates and locks from battery through its upper winding and over its upper front contact to ground at the back contact of relay 43.

When relay 35 again releases at the end of the fourth releasing movement of the T-handle, the EMG lamp at the instructor's desk is again extinguished and ground is removed from conductor 37 whereupon with relay 38 released, the locking circuit of relay 41 is opened and relay 41 releases. With relays 38 and 41 now both released, the locking circuit of relay 46 is opened and relay 46 releases.

In response to the pulling out of the T-handle for the fifth time, relay 35 again operates and locks and in operating lights the EMG lamp at the instructor's desk and establishes a circuit from ground over its inner upper contacts, over the upper back contacts of relays 44 and 46, over the lower contacts of relay 39 and through the inner lower normal contacts and winding of the Z3 relay 36 to battery. Relay 36 thereupon operates and locks over its inner lower alternate contacts to ground at the back contact of relay 43. With relay 39 operated, the reoperation of relay 35 is ineffective to further control the operation of relays 38 and 41. At its upper contacts, relay 36 connects battery to the circuits of the "hook out" lamp on the pilot's distribution panel and the "arresting hook" lamp at the instructor's desk indicative of the fact that the hook has been manually extended.

When the T-handle is again released and the cam 20 reaches its normal position, a circuit is established from ground over the spring assembly 22 in its normal position, over the lower contacts of relay 36 and through the winding 18 of the solenoid 17 to the 115-volt source of power. The solenoid now attracts its core and thereby moves the collar 15 into the path of arm 10. Should the pilot again try to pull out the T-handle it will resist such movement since the arm 10 is now blocked. This simulates the blocking of the T-handle when the ratchet mechanism operated thereby in a regular airplane has extended the arresting hook to the limit of its movement.

To restore the operated relays 36 and 39, the instructor may operate the switch 48 thereby operating the locking ground supply (LK) relay 43 which removes locking ground from relays 36 and 39. When relay 36 releases, the "hook out" and "arresting hook" lamps become extinguished and the solenoid 17 is released.

What is claimed is:

1. In apparatus for simulating the operations incident to the extension of the arresting hook of a carrier based airplane, a switch operable by a pilot under training to either an out or to an in position in simulation of the electrical control of the arresting hook of an airplane, an instructor's desk, a lamp associated with said switch and a lamp at said desk, a circuit established when said switch is operated to its out position for lighting said lamps, and a key at said instructor's desk for rendering said circuit ineffective to simulate the failure of the electrical control of the arresting hook.

2. In apparatus for simulating the operations incident to the extension of the arresting hook of a carrier based airplane, a switch operable by a pilot under training to either an out or to an in position in simulation of the electrical control of the arresting hook of an airplane, an instructor's desk, a lamp associated with said switch and a lamp at said desk, a circuit-breaker, a circuit established if said circuit-breaker is closed and said switch is operated to its out position for lighting said lamps, and a key at said instructor's desk for causing said circuit-breaker to open to render said circuit ineffective in simulation of the failure of the power supply for the electrical control of the arresting hook.

3. In apparatus for simulating the operations incident to the extension of the arresting hook of a carrier based airplane, a switch operable by a pilot under training to either an out or to an in position in simulation of the electrical control of the arresting hook of an airplane, an instructor's desk, a lamp associated with said switch and a lamp at said desk, a circuit established when said switch is operated to its out position for lighting said lamps, a key at said instructor's desk for rendering said circuit ineffective to simulate the failure of the electrical control of the arresting hook, an emergency control handle operable by the pilot should the electrical control fail, a switch operable in response to the operation of said handle to the limit of its movement, counting relays successively operated in response to the repeated operation of said switch when said handle is repeatedly operated, and a circuit controlled by said relays for causing said lamps to light when said handle has been operated the number of times which would be requisite to cause the full extension of the arresting hook of an actual airplane.

4. In apparatus for simulating the operations incident to the extension of the arresting hook of a carrier based airplane, an emergency control handle, a switch operable in response to the operation of said handle to the limit of its movement, counting relays successively operable in response to the repeated operation of said switch when said handle is repeatedly operated, a lamp, a circuit controlled by said relays for causing said lamp to light when said handle has been operated the number of times which would be requisite to cause the full extension of the arresting hook of an actual airplane, and means controlled by said relays for locking said handle against operation after said handle has been operated said requisite number of times.

5. In apparatus for simulating the operations incident to the extension of the arresting hook of a carrier based airplane, an emergency control handle, a switch operable in response to the operation of said handle to the limit of its movement, a control relay operable upon each operation of said switch, an instructor's desk, a lamp at said desk lighted upon each operation of said relay to inform the instructor that the pilot under training is using the emergency handle, counting relays successively operable in response to the repeated operation of said control relay upon the repeated operation of said control handle, a hook out lamp observable by the pilot under training, a hook out lamp at said instructor's desk, and a circuit controlled by said counting relays for causing said latter lamps to light when said handle has been operated the number of times which would be requisite to cause the full extension of the arresting hook of an actual airplane.

6. In apparatus for simulating the operations incident to the extension of the arresting hook of a carrier based airplane, an emergency control handle, a shaft, a pulley secured to said shaft and rotatable through substantially one revolution in response to each operation of said handle to the limit of its movement, a loading spring for restraining the movement of said shaft, a switch operable by a cam on said shaft, counting relays successively operable in response to the repeated operation of said switch when said handle is repeatedly operated, a lamp, a circuit controlled by said relays for causing said lamp to light when said handle has been operated the number of times which would be requisite to cause the full extension of the arresting hook of an actual airplane, and an electromagnetically operated stop controlled by said relays for locking said pulley and said handle against operation after said handle has been operated the requisite number of times.

7. In apparatus for simulating the operations incident to the extension of the arresting hook of a carrier based airplane, an emergency control handle, a shaft, a pulley secured to said shaft and rotatable through substantially one revolution in response to each operation of said handle to the limit of its movement, a loading spring for restraining the movement of said shaft, a first switch operable by said shaft when said handle is operated to the limit of its movement, a control relay operable by said switch, a transfer switch operable to its alternate position whenever said shaft is operated out of its normal position, a locking circuit for said relay controlled by said latter switch whereby said relay when operated is held operated until said handle returns to its normal position, counting relays successively operated in response to the repeated operation of said control relay upon the repeated operation of said control handle, a lamp and a circuit jointly controlled by said relays and by said latter switch for causing said lamp to light when said handle has been operated the number of times which would be requisite to cause the full extension of the arresting hook of an actual airplane.

RUSSELL B. BUCHANAN.

REFERENCES CITED

The following references are of record in the file of this patent:

UNITED STATES PATENTS

| Number | Name | Date |
| --- | --- | --- |
| 1,635,061 | Traver | July 5, 1927 |
| 1,816,621 | Stacy | July 28, 1931 |
| 1,972,941 | Lewis | Sept. 11, 1934 |
| 2,206,660 | Bryce | July 2, 1940 |
| 2,262,756 | Clexton | Nov. 18, 1941 |
| 2,375,413 | Guenther | May 8, 1945 |